US011977284B2

(12) United States Patent
Motoya et al.

(10) Patent No.: US 11,977,284 B2
(45) Date of Patent: May 7, 2024

(54) OPTICAL WAVEGUIDE DEVICE, MANUFACTURING METHOD OF OPTICAL MODULATION ELEMENT, OPTICAL MODULATOR, OPTICAL MODULATION MODULE, AND OPTICAL TRANSMISSION APPARATUS

(71) Applicant: SUMITOMO OSAKA CEMENT CO., LTD., Tokyo (JP)

(72) Inventors: Masayuki Motoya, Tokyo (JP); Shotaro Hirata, Tokyo (JP); Kosuke Okahashi, Tokyo (JP); Yu Kataoka, Tokyo (JP); Shingo Takano, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 116 days.

(21) Appl. No.: 17/827,022

(22) Filed: May 27, 2022

(65) Prior Publication Data

US 2022/0381977 A1    Dec. 1, 2022

(30) Foreign Application Priority Data

May 28, 2021  (JP) ................. 2021-089825

(51) Int. Cl.
  *G02F 1/225*    (2006.01)
  *G02B 6/12*    (2006.01)
  (Continued)

(52) U.S. Cl.
  CPC ....... *G02F 1/0356* (2013.01); *G02B 6/12004* (2013.01); *G02B 6/136* (2013.01);
  (Continued)

(58) Field of Classification Search
  CPC ........ G02F 1/212; G02F 1/0356; G02F 1/035; G02F 1/0316; G02F 1/2255; G02F 2201/063
  See application file for complete search history.

(56) References Cited

U.S. PATENT DOCUMENTS 5,018,813 A * 5/1991 Roddy ................. H04N 1/1911
                                          385/16
6,068,781 A * 5/2000 Tsuruma ................. G02F 1/035
                                          216/13
(Continued)

FOREIGN PATENT DOCUMENTS

JP     H06130338 A  *  5/1994
JP     H09-185025      7/1997
(Continued)

OTHER PUBLICATIONS

Wang, Cheng et al., Integrated lithium niobate electro-optic modulators operating at CMOS-compatible voltages, 2018, Nature, 562, 100-105. (Year: 2018).*

(Continued)

*Primary Examiner* — Michelle R Connelly
*Assistant Examiner* — Kirsten D. Endresen
(74) *Attorney, Agent, or Firm* — Rankin, Hill & Clark LLP

(57) ABSTRACT

There is provided an optical waveguide device including: a substrate; an optical waveguide formed on the substrate; and a working electrode that controls a light wave propagating through the optical waveguide, in which the working electrode includes a first base layer made of a first material, a first conductive layer on the first base layer, a second base layer made of a second material different from the first material, which is on the first conductive layer, and a second conductive layer on the second base layer, and an edge of the second base layer is covered with the second conductive (Continued)

layer, in a cross-section perpendicular to an extending direction of the optical waveguide.

14 Claims, 10 Drawing Sheets

(51) Int. Cl.
*G02B 6/136* (2006.01)
*G02F 1/035* (2006.01)
*G02F 1/21* (2006.01)

(52) U.S. Cl.
CPC ............ *G02F 1/212* (2021.01); *G02F 1/2255* (2013.01); *G02B 2006/12126* (2013.01); *G02B 2006/12142* (2013.01)

(56) References Cited

U.S. PATENT DOCUMENTS

| | | | |
|---|---|---|---|
| 6,444,957 B1* | 9/2002 | Kitagawa | H01L 21/67103 219/544 |
| 10,416,526 B2* | 9/2019 | Kondou | G02F 1/2255 |
| 10,473,998 B2* | 11/2019 | Sugamata | G02F 1/0327 |
| 2003/0062551 A1* | 4/2003 | Chen | G02F 1/0316 257/211 |
| 2003/0059146 A1 | 5/2003 | Mirshekar-Syahkal | |
| 2019/0171043 A1 | 6/2019 | Epping et al. | |

FOREIGN PATENT DOCUMENTS

| | | |
|---|---|---|
| JP | 2007-264548 | 10/2007 |
| WO | 2018/031916 | 2/2018 |

OTHER PUBLICATIONS

Werner et al. Optical constants and inelastic electron-scattering data for 17 elemental metals, J. Phys Chem Ref. Data 38,1013-1092 (2009) [retrieved on Nov. 14, 2023]. Retrieved from the internet <URL: https://refractiveindex.info/?shelf=main&book=Ta&page=Werner>. (Year: 2009).*

Honsberg, C.B. and Bowden, S.G., Absorption Coefficient. Photovoltaics Education Website [online], [retrieved Nov. 14, 2023]. Retrieved from the internet <URL: https://www.pveducation.org/pvcdrom/pn-junctions/absorption-coefficient>. (Year: 2019).*

* cited by examiner

DETAIL OF PART A

OPTICAL WAVEGUIDE DEVICE, MANUFACTURING METHOD OF OPTICAL MODULATION ELEMENT, OPTICAL MODULATOR, OPTICAL MODULATION MODULE, AND OPTICAL TRANSMISSION APPARATUS

CROSS-REFERENCE TO RELATED APPLICATIONS

This application claims the benefit of Japanese Patent Application No. 2021-089825 filed May 28, 2021, the disclosure of which is herein incorporated by reference in its entirety.

BACKGROUND OF THE INVENTION

Field of the Invention

The present invention relates to an optical waveguide device, a manufacturing method of an optical modulation element, an optical modulator, an optical modulation module, and an optical transmission apparatus.

Description of Related Art

In a commercial optical fiber communication system, an optical modulator incorporating an optical modulation element as an optical waveguide device including an optical waveguide formed on a substrate and a working electrode for controlling a light wave by acting an electric field on the optical waveguide is often used. Among the optical modulation elements, an optical modulation element using LiNbO3 (hereinafter, also referred to as LN) having an electro-optic effect for a substrate can achieve high-frequency optical modulation characteristics with less optical loss, so that it is widely used in optical fiber communication systems for high-frequency, large-capacity backbone optical transmission networks and metro networks.

As one measure for miniaturization, high-frequency, and power saving of such optical modulation elements, an optical modulator in which an LN substrate is thinned to strengthen an interaction between a signal electric field and a waveguide light in the substrate (that is, to increase electric field efficiency), or an optical modulator using a rib-type optical waveguide or a ridge optical waveguide (hereinafter, collectively referred to as a protruding optical waveguide) configured by forming a band-shaped protruding portion on a surface of the LN substrate is also being put into practical use (for example, Japanese Laid-open Patent Publication No. 2007-264548 and Pamphlet of International Publication No. WO 2018/031916).

Further, for a high-frequency in an operation speed, in the related art, in order to set an impedance of a working electrode within a predetermined range while matching a speed of an electrical signal propagating through the working electrode with a speed of a light wave propagating through an optical waveguide, the working electrode includes two stages on a substrate (see, for example, Japanese Laid-open Patent Publication No. 1997-185025). Further, at present, for the more high-frequency, in order to further increase electric field efficiency, a study is underway to provide a first stage of a working electrode closer to a protruding optical waveguide.

Meanwhile, when the two-stage electrode is brought close to the protruding optical waveguide in this manner, a complicated and fine uneven shape may exist on a substrate in a process of forming the electrode. Therefore, for example, in a case where a metal film formed on the substrate is etched in a patterning step, an etching rate of the metal film may be different in a plane of the substrate due to an uneven distribution of the corrugated structure on the substrate. As a result, as illustrated in FIG. 12, for example, when etching an unnecessary base layer 702 (black-painted layer) formed in a fine uneven portion in the vicinity of protruding optical waveguides 700a and 700b ((a) of FIG. 12), the base layer 702 at a second stage of working electrodes 704a, 704b, and 704c is excessively etched (so-called over-etched) in a wide range, for example, up to a conductive layer 706 above the base layer 702, so a situation may occur in which overhanging of the conductive layer 706 occurs ((b) of FIG. 12).

SUMMARY OF THE INVENTION

From the background described above, it is desired to achieve an optical waveguide device having an electrode structure capable of preventing over-etching of abase layer of an electrode and preventing overhanging of a conductive layer above the electrode base layer from occurring.

According to one aspect of the present invention, there is provided an optical waveguide device including: a substrate; an optical waveguide formed on the substrate; and a working electrode that controls a light wave propagating through the optical waveguide, in which the working electrode includes a first base layer made of a first material, a first conductive layer on the first base layer, a second base layer made of a second material different from the first material, which is on the first conductive layer, and a second conductive layer on the second base layer, and an edge of the second base layer is covered with the second conductive layer, in a cross-section perpendicular to an extending direction of the optical waveguide.

According to another aspect of the present invention, the optical waveguide device may further include: a wiring electrode connected to the working electrode, and the wiring electrode may include the second conductive layer extending from the working electrode.

According to still another aspect of the present invention, the second material may be made of titanium (Ti), and the first conductive layer and the second conductive layer may be made of gold (Au).

According to still another aspect of the present invention, the first material may include niobium (Nb).

According to still another aspect of the present invention, a thickness of the first base layer may be equal to or lower than 30 nm, and a thickness of the second base layer may be equal to or higher than 100 nm.

According to still another aspect of the present invention, the optical waveguide may be a protruding optical waveguide including a protruding portion extending on the substrate.

According to still another aspect of the present invention, the two working electrodes sandwiching the optical waveguide in a plane of the substrate may be provided, and a gap of the two working electrodes may be equal to or higher than 0.1 μm and equal to or lower than 5.0 μm.

According to still another aspect of the present invention, a conductor pattern including a third base layer made of a third material different from the first material and a third conductive layer on the third base layer may be formed in a region other than a path from an input end to an output end of the optical waveguide, in a region on the substrate.

According to still another aspect of the present invention, the third material may have a light absorption coefficient at a wavelength of light propagating through the optical waveguide, which is larger than a light absorption coefficient of the first material at the wavelength of the light.

According to still another aspect of the present invention, there is provided a manufacturing method of the optical waveguide device, the method including: forming a part of the second conductive layer by gold plating.

According to still another aspect of the present invention, there is provided an optical modulator including: any of the optical waveguide devices, which is an optical modulation element that modulates light; a case that houses the optical waveguide device; an optical fiber through which light is input to the optical waveguide device; and another optical fiber that guides light output by the optical waveguide device to an outside of the case.

According to still another aspect of the present invention, there is provided an optical modulation module including: any of the optical waveguide devices, which is an optical modulation element that modulates light; a case that houses the optical waveguide device; an optical fiber through which light is input to the optical waveguide device; another optical fiber that guides light output by the optical waveguide device to an outside of the case; and a drive circuit that drives the optical waveguide device.

According to still another aspect of the present invention, there is provided an optical transmission apparatus including: the optical modulator or the optical modulation module; and an electronic circuit that generates an electrical signal for causing the optical waveguide device to perform a modulation operation.

According to the present invention, there is provided an optical waveguide device capable of preventing over-etching of a base layer of a working electrode and preventing overhanging of a conductive layer above the electrode base layer from occurring.

DETAILED DESCRIPTION OF THE INVENTION

Hereinafter, embodiments of the present invention will be described with reference to the drawings.

First Embodiment

Figure 1:
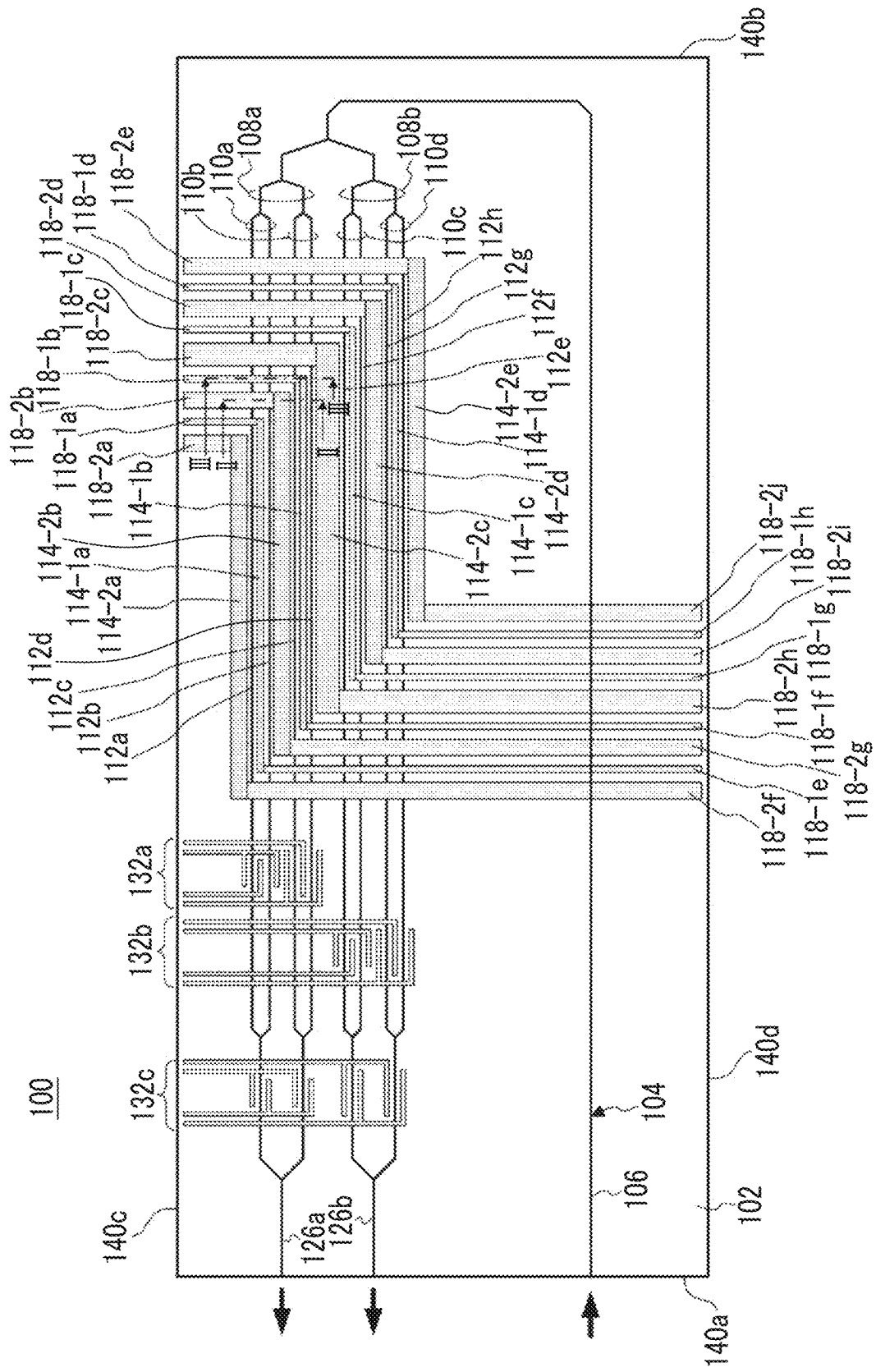
FIG. 1 is a diagram illustrating a configuration of an optical modulation element according to a first embodiment of the present invention.

FIG. 1 is a diagram illustrating a configuration of an optical modulation element 100, which is an optical waveguide device according to a first embodiment of the present invention. The optical modulation element 100 uses, for example, a wavelength in a near-infrared wavelength range including a 1.3 µm bandwidth and/or a 1.55 µm bandwidth generally used for optical communication as an operating optical wavelength.

The optical modulation element 100 includes an optical waveguide 104 formed on a substrate 102. The substrate 102 is, for example, a thinned X-cut LN substrate having an electro-optic effect, which is processed to a thickness of 20 µm or lower (for example, 2 µm). The optical waveguide 104 is a protruding optical waveguide (for example, a rib-type optical waveguide or a ridge optical waveguide) including a band-shaped extending protruding portion formed on a surface of the thinned substrate 102.

The substrate 102 is, for example, rectangular and has two left and right sides 140a and 140b extending in a vertical direction and facing each other, and upper and lower sides 140c and 140d extending in a lateral direction and facing each other.

The optical modulation element 100 constitutes a DP-QPSK optical modulator with two nest-shaped Mach-Zehnder type optical waveguides 108a and 108b. The nest-shaped Mach-Zehnder type optical waveguide 108a includes two Mach-Zehnder type optical waveguides 110a and 110b. Further, the nest-shaped Mach-Zehnder type optical waveguide 108b includes two Mach-Zehnder type optical waveguides 110c and 110d.

The Mach-Zehnder type optical waveguides 110a and 110b respectively have two parallel waveguides 112a and 112b, and two parallel waveguides 112c and 112d. Further, the Mach-Zehnder type optical waveguides 110c and 110d respectively have two parallel waveguides 112e and 112f, and two parallel waveguides 112g and 112h.

The input light (an arrow pointing to the right-side) input to an input waveguide 106 of the optical waveguide 104 on the lower side of the left side 140a of the substrate 102 is folded back by 180 degrees in a light propagation direction and is branched into two light beams, and the light beams are QPSK-modulated by two nest-shaped Mach-Zehnder type optical waveguides 108a and 108b, respectively. The two QPSK-modulated light beams are output from the upper side of the left side 140a of the substrate 102 via output waveguides 126a and 126b, respectively (two arrows pointing to the left).

These two output light beams are output from the substrate 102, polarized and combined, for example, by a polarization beam combiner into one optical beam, and transmitted to a transmission optical fiber as a DP-QPSK-modulated optical signal.

For QPSK modulation in the nest-shaped Mach-Zehnder type optical waveguide 108a, signal electrodes 114-1a and 114-1b to which high-frequency electrical signals for modulation are input are disposed between the two parallel waveguides 112a and 112b of the Mach-Zehnder type optical waveguide 110a and between the two parallel waveguides 112c and 112d of the Mach-Zehnder type optical waveguide 110b, respectively.

Further, for QPSK modulation in the nest-shaped Mach-Zehnder type optical waveguide 108b, signal electrodes 114-1c and 114-1d into which high-frequency electrical signals for modulation are input are disposed between the two parallel waveguides 112e and 112f of the Mach-Zehnder type optical waveguide 110c, and between the two parallel waveguides 112g and 112h of the Mach-Zehnder type optical waveguide 110d, respectively.

The signal electrode 114-1a constitutes a coplanar type transmission line together with the ground electrodes 114-2a and 114-2b facing each other across the parallel waveguides 112a and 112b, respectively, and the signal electrode 114-1b constitutes a coplanar type transmission line together with the ground electrodes 114-2b and 114-2c facing each other across the parallel waveguides 112c and 112d, respectively.

The signal electrode 114-1c constitutes a coplanar type transmission line together with the ground electrodes 114-2c and 114-2d facing each other across the parallel waveguides 112e and 112f, respectively, and the signal electrode 114-1d constitutes a coplanar type transmission line together with the ground electrodes 114-2d and 114-2e facing each other across the parallel waveguides 112e and 112f, respectively.

Hereinafter, the nest-shaped Mach-Zehnder type optical waveguides 108a and 108b are collectively referred to as nest-shaped Mach-Zehnder type optical waveguides 108. Further, the Mach-Zehnder type optical waveguides 110a, 110b, 110c, 110d, 110e, 110f, 110g, and 110h are collectively referred to as Mach-Zehnder type optical waveguides 110. Further, the parallel waveguides 112a, 112b, 112c, 112d, 112e, 112f, 112g, and 112h are collectively referred to as parallel waveguides 112. Further, the signal electrodes 114-1a, 114-1b, 114-1c, and 114-1d are collectively referred to as signal electrodes 114-1. Further, the ground electrodes 114-2a, 114-2b, 114-2c, 114-2d, and 114-2e are collectively referred to as ground electrodes 114-2.

Further, the signal electrode 114-1 and the ground electrode 114-2 are collectively referred to as working electrodes 114. The signal electrode 114-1 and the ground electrode 114-2, which are the working electrodes 114, control the light wave propagating in the optical waveguide 104. Further, the signal electrode 114-1 and the ground electrode 114-2 are two working electrodes 114 that sandwich the parallel waveguide 112 of the optical waveguide 104 in the plane of the substrate 102.

The right edges of the signal electrodes 114-1a, 114-1b, 114-1c, and 114-1d are connected to signal wiring electrodes 118-1a, 118-1b, 118-1c, and 118-1d, respectively. Further, the left edges of the signal electrodes 114-1a, 114-1b, 114-1c, and 114-1d are connected to signal wiring electrodes 118-1e, 118-1f, 118-1g, and 118-1h, respectively.

The right ends of the ground electrodes 114-2a, 114-2b, 114-2c, 114-2d, and 114-2e are connected to ground wiring electrodes 118-2a, 118-2b, 118-2c, 118-2d, and 118-2e, respectively. Thus, the signal wiring electrodes 118-1a, 118-1b, 118-1c, and 118-1d and the ground wiring electrodes 118-2a, 118-2b, 118-2c, 118-2d, and 118-2e adjacent to these signal wiring electrodes constitute a coplanar type transmission line.

In the same manner, the left ends of the ground electrodes 114-2a, 114-2b, 114-2c, 114-2d, and 114-2e are connected to ground wiring electrodes 118-2f, 118-2g, 118-2h, 118-2i, and 118-2j, respectively. Thus, the signal wiring electrodes 118-1e, 118-1f, 118-1g, and 118-1h and the ground wiring electrodes 118-2f, 118-2g, 118-2h, 118-2i, and 118-2j adjacent to the signal wiring electrodes constitute a coplanar type transmission line.

The signal wiring electrodes 118-1e, 118-1f, 118-1g, and 118-1h extending to the lower side 140d of the substrate 102 are terminated by a termination resistor having a predetermined impedance outside the substrate 102.

Thus, the high-frequency electrical signal input from the signal wiring electrodes 118-1a, 118-1b, 118-1c, and 118-1d extending to the upper side 140c of the substrate 102 becomes a traveling wave to propagate through the signal electrodes 114-1a, 114-1b, 114-1c, and 114-1d, and modulates the light wave propagating through the Mach-Zehnder type optical waveguides 110a, 110b, 110c, and 110d, respectively.

Hereinafter, the signal wiring electrodes 118-1a, 118-1b, 118-1c, 118-1d, 118-1e, 118-1f, 118-1g, and 118-1h are collectively referred to as signal wiring electrodes 118-1. Further, the ground wiring electrodes 118-2a, 118-2b, 118-2c, 118-2d, 118-2e, 118-2f, 118-2g, 118-2h, 118-2i, and 118-2j are collectively referred to as ground wiring electrodes 118-2. Further, the signal wiring electrode 118-1 and the ground wiring electrode 118-2 are collectively referred to as wiring electrodes 118. That is, the signal wiring electrode 118-1 and the ground wiring electrode 118-2 are the wiring electrodes 118 connected to the working electrode 114.

Further, a bias electrode 132a that adjusts bias points of the Mach-Zehnder type optical waveguides 110a and 110b, a bias electrode 132b that adjusts bias points of the Mach-Zehnder type optical waveguides 110c and 110d, and a bias electrode 132c that adjusts bias points of the nest-shaped Mach-Zehnder type optical waveguides 108a and 108b are provided, on the substrate 102.

Figure 2:
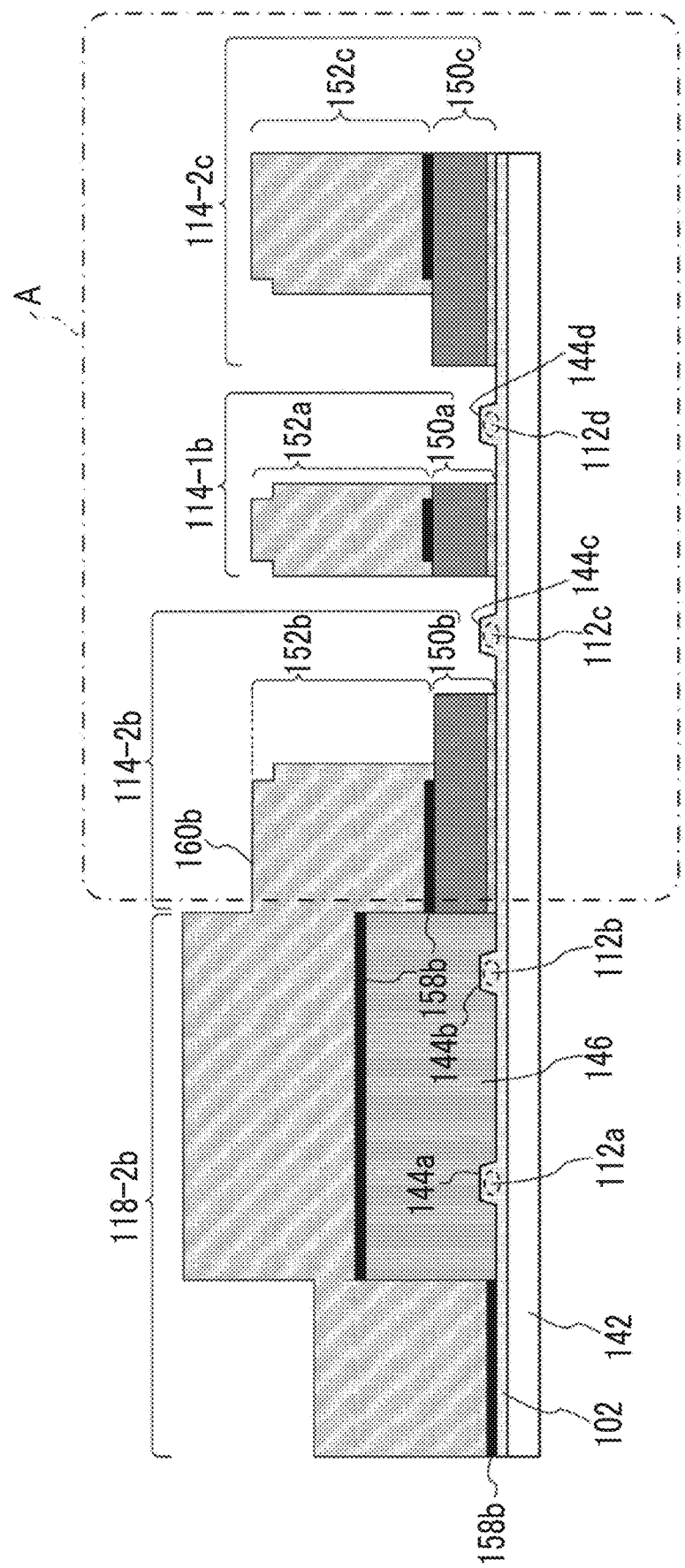
FIG. 2 is a cross-sectional view taken along line II-II of the optical modulation element illustrated in FIG. 1.
Figure 3:
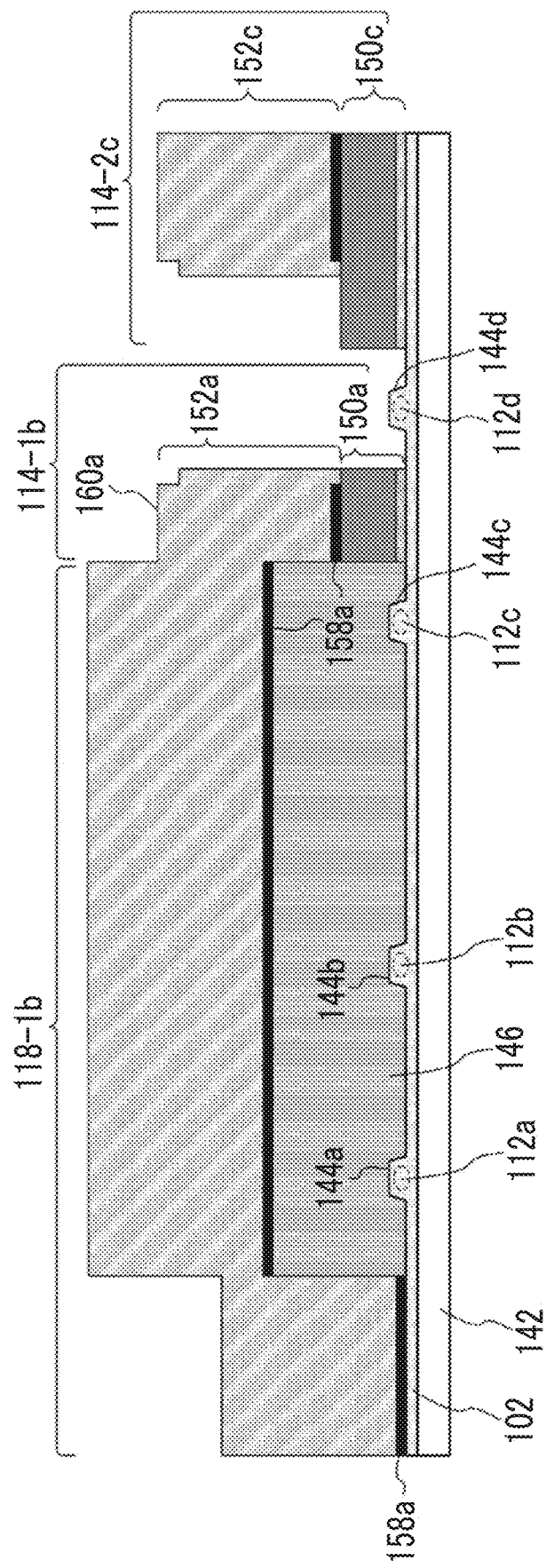
FIG. 3 is a cross-sectional view taken along line III-III of the optical modulation element illustrated in FIG. 1.

FIG. 2 is a cross-sectional view taken along line II-II of the optical modulation element 100 illustrated in FIG. 1. Further, FIG. 3 is a cross-sectional view taken along line III-III of the optical modulation element 100 illustrated in FIG. 1. A back surface (lower surface in FIG. 2) of the substrate 102 is supported and reinforced by a supporting plate 142. The supporting plate 142 is, for example, glass. The parallel waveguides 112a, 112b, 112c, and 112d are formed on an upper surface of the substrate 102, as protruding optical waveguides, by protruding portions 144a, 144b, 144c, and 144d formed on the substrate 102, respectively. The four dotted ellipses schematically illustrate light propagating through the parallel waveguide 112a, 112b, 112c, and 112d, which are protruding optical waveguides, respectively. Hereinafter, the protruding portions on the substrate 102 constituting the optical waveguide 104, including the protruding portions 144a, 144b, 144c, and 144d, are collectively referred to as protruding portions 144.

With reference to FIG. 2, on the substrate 102, the signal electrodes 114-1b and the ground electrodes 114-2b and 114-2c, which are the working electrodes 114, are arranged at positions to sandwich the parallel waveguides 112c and 112d in the plane of the substrate 102. The signal electrode 114-1b, and the ground electrodes 114-2b and 114-2c are two stage electrodes including first-stage electrodes 150a, 150b, and 150c, and second-stage electrodes 152a, 152b, and 152c, respectively.

Figure 4:
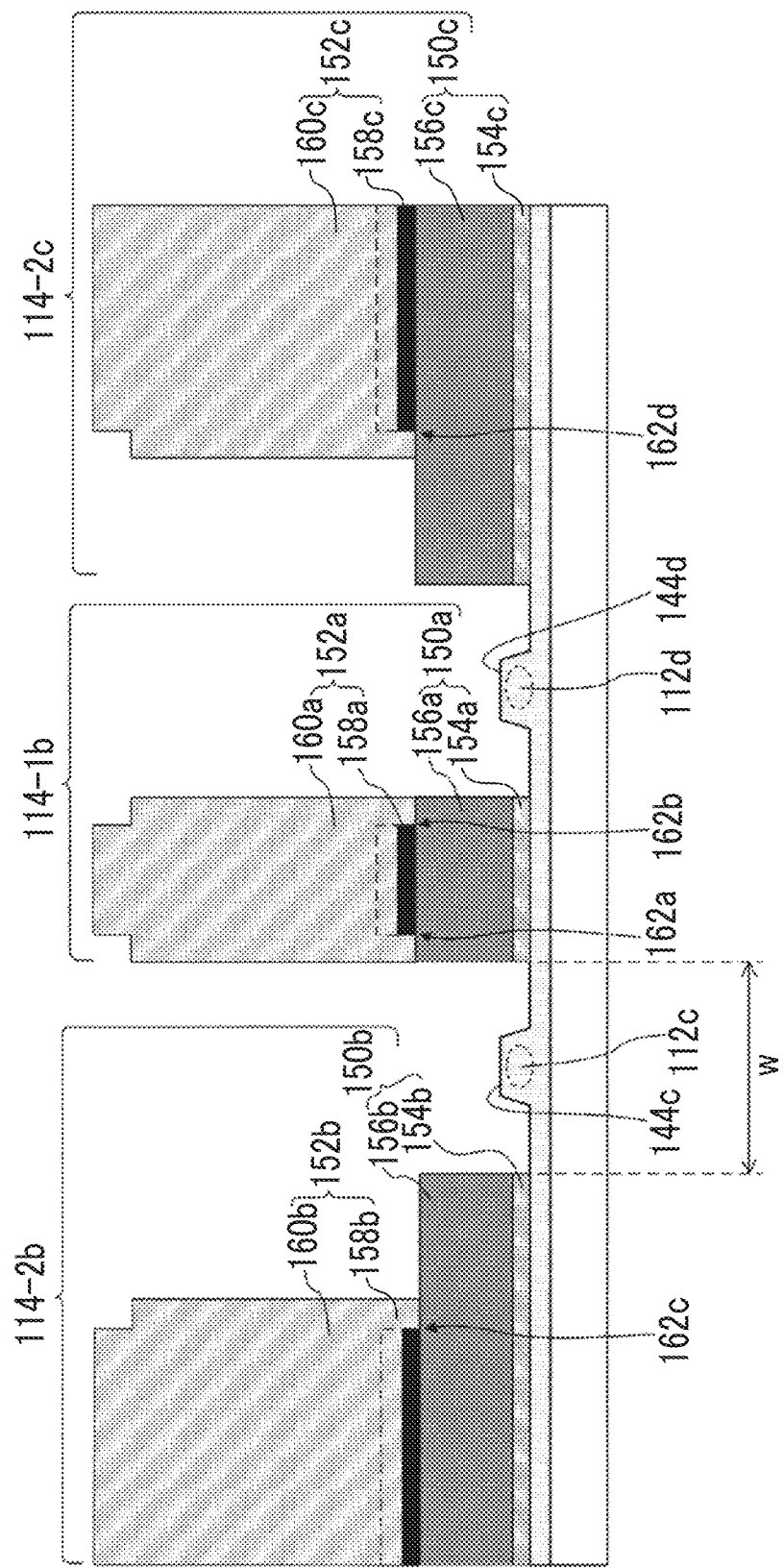
FIG. 4 is a partial detailed view of part A illustrated in FIG. 2.

FIG. 4 is a partial detailed view of part A illustrated in FIG. 2. The signal electrode 114-1b includes a first base layer 154a, a first conductive layer 156a on the first base layer 154a, a second base layer 158a on the first conductive layer 156a, and a second conductive layer 160a on the second base layer 158a. The first base layer 154a and the first conductive layer 156a constitute the first-stage electrode 150a, and the second base layer 158a and the second conductive layer 160a constitute the second-stage electrode 152a.

The first base layer 154a is made of a first material, and the second base layer 158a is made of a second material different from the first material. In the present embodiment, the first material is niobium (Nb) and the second material is titanium (Ti). Further, both the first conductive layer 156 and the second conductive layer 160 are gold (Au).

Then, in a cross-section perpendicular to an extending direction of the parallel waveguide 112, an edge 162a of the second base layer 158a on the parallel waveguide 112c side is covered with the second conductive layer 160a. In the same manner, in the cross-section perpendicular to the extending direction of the parallel waveguide 112, an edge 162b of the second base layer 158a on the parallel waveguide 112d side is covered with the second conductive layer 160a.

Further, the ground electrode 114-2b includes a first base layer 154b, a first conductive layer 156b on the first base layer 154b, a second base layer 158b on the first conductive layer 156b, and a second conductive layer 160b on the second base layer 158b. The first base layer 154b and the first conductive layer 156b constitute the first-stage electrode 150b, and the second base layer 158b and the second conductive layer 160b constitute the second-stage electrode 152b. The first base layer 154b is made of a first material, and the second base layer 158b is made of a second material different from the first material. Then, in the cross-section perpendicular to the extending direction of the parallel waveguide 112, an edge 162c of the second base layer 158b on the parallel waveguide 112c side is covered with the second conductive layer 160b.

In the same manner, the ground electrode 114-2c includes a first base layer 154c, a first conductive layer 156c on the first base layer 154c, a second base layer 158c on the first conductive layer 156c, and a second conductive layer 160c on the second base layer 158c. The first base layer 154c and the first conductive layer 156c constitute the first-stage electrode 150c, and the second base layer 158c and the second conductive layer 160c constitute the second-stage electrode 152c. The first base layer 154c is made of a first material, and the second base layer 158c is made of a second material different from the first material. Then, in the cross-section perpendicular to the extending direction of the parallel waveguide 112, an edge 162d of the second base layer 158c on the parallel waveguide 112d side is covered with the second conductive layer 160c.

The other signal electrodes 114-1a, 114-1c, and 114-1d other than the signal electrode 114-1b, and the other ground electrodes 114-2a, 114-2d, and 114-2e other than the ground electrodes 114-2b and 114-2c are also configured in the same manner as the signal electrodes 114-1a and the ground electrodes 114-2a and 114-2b described above. Hereinafter, the first base layers, the first conductive layers, the second base layers, and the second conductive layers of the signal electrode 114-1 and the ground electrode 114-2 are collectively referred to as first base layers 154, first conductive layers 156, second base layers 158, and second conductive layers 160, respectively.

Further, the first-stage electrodes including the first base layer 154 and the first conductive layer 156 of the working electrode 114, including the first-stage electrodes 150a, 150b, and 150c illustrated in FIG. 4, are collectively referred to as first-stage electrodes 150. Further, the second-stage electrodes including the second base layer 158 and the second conductive layer 160 of the working electrode 114, including the second-stage electrodes 152a, 152b, and 152c, are collectively referred to as second-stage electrodes 152. Further, the edges of the second base layer 158 on the adjacent parallel waveguide 112 side, including the edges 162a, 162b, 162c, and 162d are collectively referred to as edges 162.

That is, in the optical modulation element 100, the signal electrode 114-1 and the ground electrode 114-2, which are the working electrodes 114, include the first base layer 154 made of a first material, the first conductive layer 156 on the first base layer 154, the second base layer 158, which is the second base layer 158 on the first conductive layer 156c and is made of a second material different from the first material, and the second conductive layer 160 on the second base layer 158, respectively. Then, in the cross-section perpendicular to the extending direction of the parallel waveguide 112, the edge 162 of the second base layer 158 of the working electrode 114 on the parallel waveguide 112 side is covered with the second conductive layer 160.

With reference to FIG. 2, the ground wiring electrode 118-2b connected to the ground electrode 114-2b is provided, on the substrate 102. The ground wiring electrode 118-2b is configured such that the second-stage electrode 152b of the ground electrode 114-2b is extended on the substrate 102 in a left direction. That is, the ground wiring electrode 118-2b includes the second conductive layer 160b extending from the ground electrode 114-2b. In the present embodiment, a resin layer 146 is provided between the ground wiring electrode 118-2b and the parallel waveguides 112a and 112b.

With reference to FIG. 3, the signal wiring electrode 118-1b connected to the signal electrode 114-1b is provided, on the substrate 102. In the same manner as the ground wiring electrode 118-2b in FIG. 2, the signal wiring electrode 118-1b is configured such that the second-stage electrode 152a of the signal electrode 114-1b is extended on the substrate 102 in the left direction. That is, the signal wiring electrode 118-1b includes the second conductive layer 160 extending from the signal electrode 114-1b. In the present embodiment, the resin layer 146 is provided between the signal wiring electrode 118-1b and the parallel waveguides 112a, 112b, and 112c.

The other ground wiring electrodes 118-2 other than the ground wiring electrode 118-2b are also configured in the same manner as the ground wiring electrode 118-2b in FIG. 2. Further, the other signal wiring electrodes 118-1 other than the signal wiring electrodes 118-1b are also configured in the same manner as the signal wiring electrodes 118-1b.

That is, the optical modulation element 100 includes the wiring electrode 118 connected to the working electrode 114, and the wiring electrode 118 includes the second conductive layer 160 extending from the working electrode 114. Then, the resin layer 146 is formed between the wiring electrode 118 and the optical waveguide 104 under the wiring electrode 118.

In the optical modulation element 100 having the configuration described above, the first material constituting the first base layer 154 of the signal electrode 114-1 and the ground electrode 114-2, which are the working electrodes 114, includes a material different from the second material constituting the second base layer 158, for example, niobium. Niobium has a small light absorption coefficient at an operating optical wavelength of the optical modulation element 100 (for example, 1.3 μm bandwidth and/or 1.55 μm bandwidth, which are wavelengths for optical communication), as compared with titanium, which is generally used as a base layer material for electrodes in the related art. Therefore, the first-stage electrode 150 of these working electrodes 114 can be disposed closer to the parallel waveguide 112 as compared with the related art. For example, in the present embodiment, a gap W (see FIG. 4) between the signal electrode 114-1 and the ground electrode 114-2, which are the two working electrodes 114 sandwiching the parallel waveguide 112, is equal to or higher than 1.0 µm and equal to or lower than 5.0 µm.

On the other hand, in the optical modulation element 100, as the second material of the second base layer 158, a material different from the first material, for example, titanium in the same manner as the related art can be used, so that the second-stage electrode 152 can be firmly fixed to the first-stage electrode 150. As a result, the optical modulation element 100 can achieve a high-frequency optical modulation operation having a lower drive voltage with high reliability, as compared with the related art.

Figure 12:
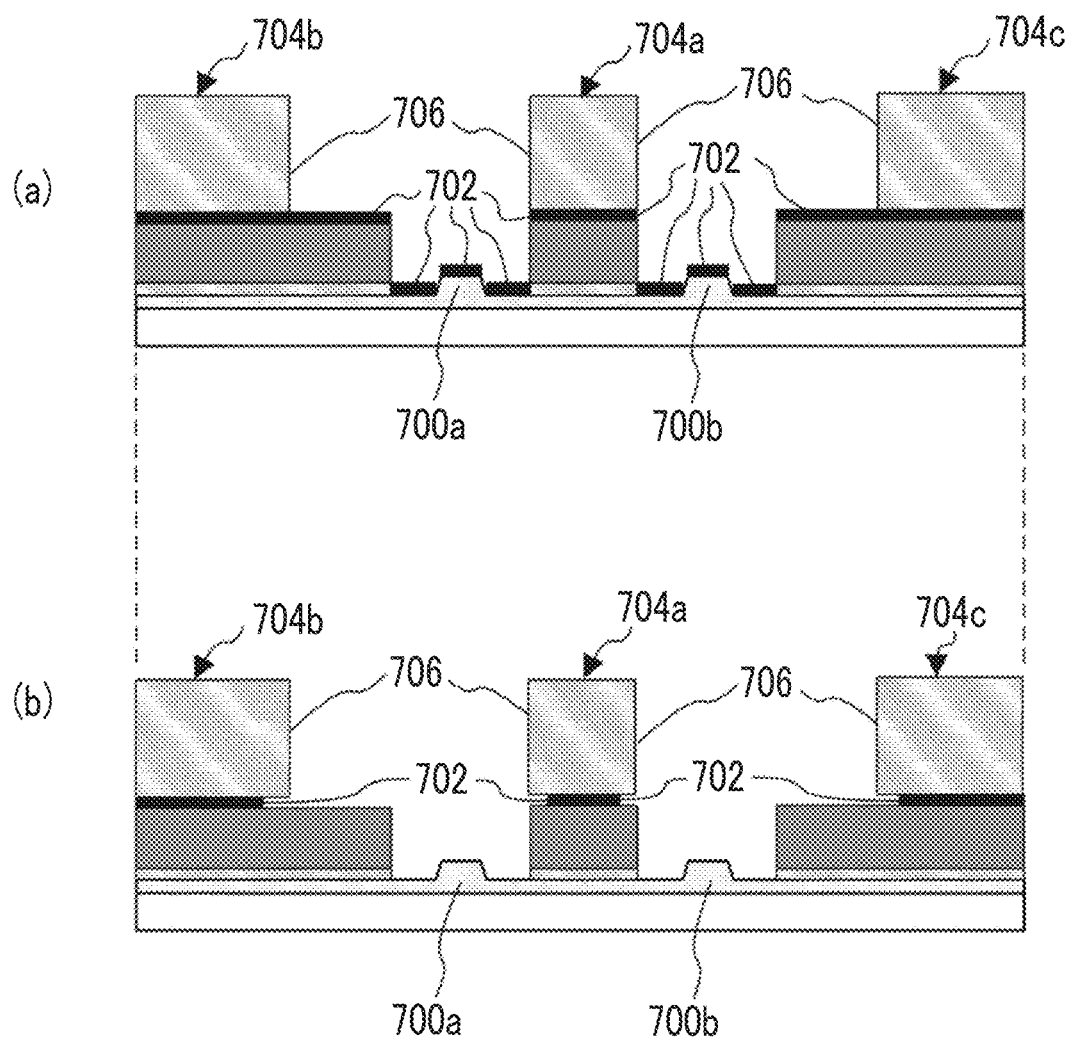
FIG. 12 is a diagram describing electrode formation of an optical waveguide device in the related art.

Further, in particular, in the optical modulation element 100, as illustrated in FIG. 4, in the cross-section perpendicular to the extending direction of the parallel waveguide 112, the edge 162 of the second base layer 158 on the parallel waveguide 112 side, of the signal electrode 114-1 and the ground electrode 114-2, which are the working electrodes 114, is covered with the second conductive layer 160 on the second base layer 158. Thus, in the optical modulation element 100, when a film of the second material (material of the second base layer 158) remaining on the substrate 102 after formation of the second conductive layer 160 of the working electrode 114 is etched, it is possible to prevent the second base layer 158 below the second conductive layer 160 from being over-etched. As a result, in the optical modulation element 100, it is possible to prevent overhanging as illustrated in FIG. 12 from occurring in the second conductive layer 160 due to the over-etching of the second base layer 158.

Figure 5:
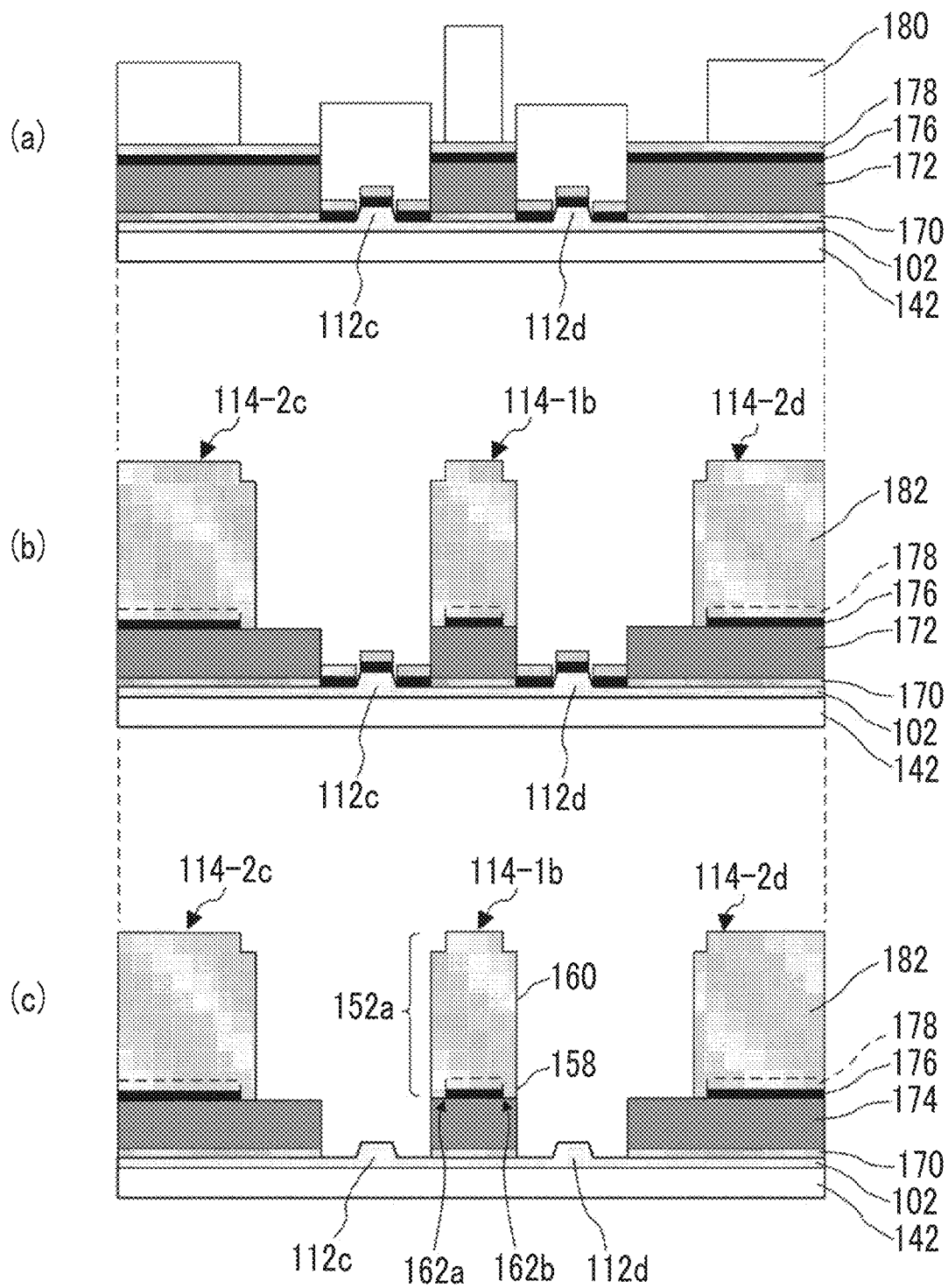
FIG. 5 is a diagram describing an electrode forming step in part B illustrated in FIG. 2.

FIG. 5 is a diagram illustrating an example of an electrode forming step of the optical modulation element 100 in part A in FIG. 2. (a) of FIG. 5 illustrates a state in which a first layer 170 made of a first material and a second layer 172 made of Au are formed on the substrate 102 to perform first patterning, and then a third layer 176 made of a second material and a fourth layer 178 which is an Au thin film are formed. Here, the Au thin film of the fourth layer 178 is formed by, for example, electron beam deposition.

In each of (a), (b), and (c) of FIG. 5, it is understood that each of the other layers illustrated by the same type of hatching as each of the first layer 170, the second layer 172, the third layer 176, and the fourth layer 178 illustrated on the right side, and a resist 180 and a fifth layer 182 which will be described below, are also the first layer 170, the second layer 172, the third layer 176, the fourth layer 178, the resist 180, and the fifth layer 182.

In (a) of FIG. 5, the first layer 170 and the second layer 172 are removed above the parallel waveguides 112c and 112d, by the first patterning. Therefore, the third layer 176 and the fourth layer 178 are formed above and around the parallel waveguides 112c and 112d. In (a) of FIG. 5, the resist 180 for etching the third layer 176 and the fourth layer 178 is further formed on the fourth layer 178.

(b) of FIG. 5 illustrates a state in which the third layer 176 and the fourth layer 178 formed on the second layer 172 in the state illustrated in (a) of FIG. 5 are etched, and then the fifth layer 182 which is an Au thick film is formed and patterned on the fourth layer 178 by plating. The second conductive layer 160 of the signal electrode 114-1b includes the fourth layer 178 and the fifth layer 182, both of which include Au. The same applies to the ground electrodes 114-2c and 114-2d. That is, the manufacturing method (manufacturing step) of the optical modulation element 100 includes a step of forming a part of the second conductive layer by gold plating.

In (b) of FIG. 5, the third layer 176 and the fourth layer 178 located above and around the parallel waveguides 112c and 112d are left so as to reduce potential unevenness on an upper surface of the substrate 102 and ensure homogeneity of the Au thick film when the Au thick film of the fifth layer 182 is formed by plating.

(c) of FIG. 5 illustrates a state in which the third layer 176 and the fourth layer 178 located above and around the parallel waveguides 112c and 112d are removed by etching. As illustrated, the edges 162a and 162b of the second base layer 158 of the signal electrode 114-1b on respective sides of the parallel waveguides 112c and 112d are covered with the second conductive layer 160 on the second base layer 158, so that over-etching of the second base layer 158 does not occur. Therefore, the second-stage electrode 152a having an appropriate side surface without overhanging can be formed. The same applies to the ground electrodes 114-2c and 114-2d.

Meanwhile, in the present embodiment, the first base layer 154 constituting the first-stage electrode 150 of the signal electrode 114-1 includes niobium (Nb). Niobium has a smaller light absorption coefficient in a near-infrared wavelength range including in the operating optical wavelength of the optical modulation element 100, as compared with titanium (Ti) generally used as a material for the first base layer 154 in the related art. Therefore, in the optical modulation element 100, the working electrode 114 can be provided closer to the parallel waveguide 112, as compared with the related art. Therefore, in the optical modulation element 100, it is possible to increase electric field efficiency and achieve high-frequency and low-voltage operation.

Figure 6:
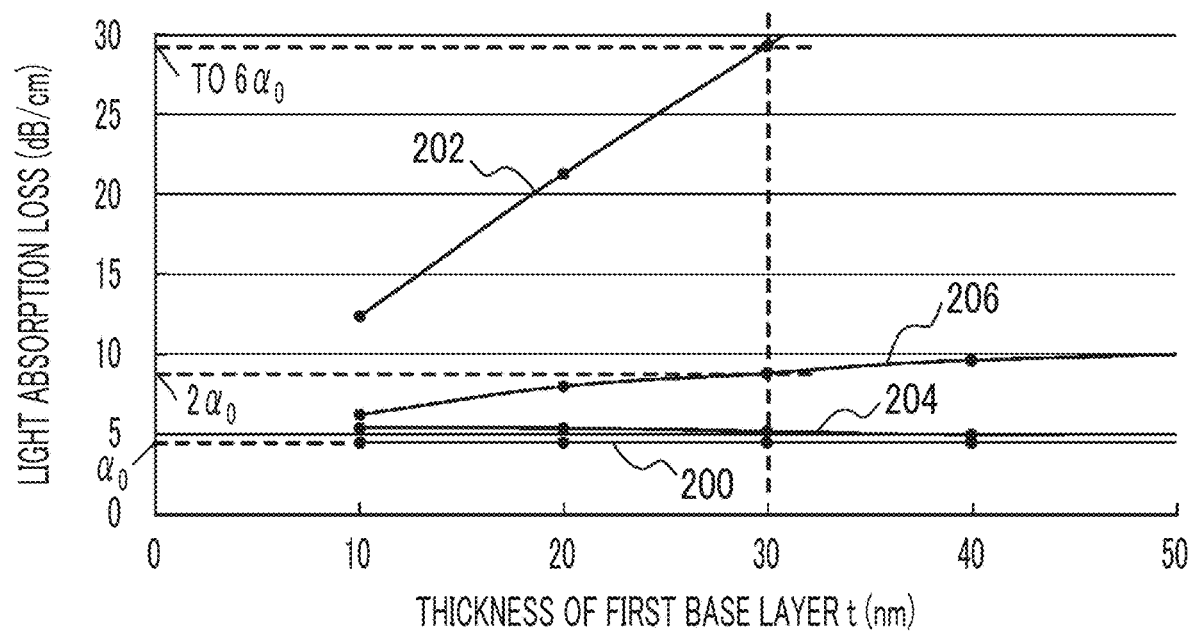
FIG. 6 is a simulation result of the amount of increase in light absorption loss with respect to a thickness of a first base layer in a case where various metals are used as the first base layer.

As described above, the material constituting the first base layer 154 may be any material having a smaller light absorption coefficient at the operating optical wavelength as compared with titanium used in the related art, and is not limited to niobium (Nb). FIG. 6 is a simulation result of the amount of increase in light absorption loss in the parallel waveguide 112c with respect to a thickness of the first base layer 154 in a case where the first base layer 154 includes various metals. In FIG. 6, in addition to a case where the first base layer 154 is not used for the first-stage electrode 150 (in a case of Au single film (only the first conductive layer 156)), a calculation result in a case where Ti, aluminum (Al), and Nb are used as materials for the first base layer 154 is illustrated.

In FIG. 6, a horizontal axis is the thickness t of the first base layer 154, and a vertical axis is the amount of light absorption loss per unit length (1 cm) of the parallel waveguide 112 adjacent to the first base layer 154. In the simulation, it is assumed that Au is used as the first conductive layer 156, and 1.55 µm is set as an operating optical wavelength. Further, in calculating the light absorption loss, the amount of light absorption at the operating wavelength of 1.55 µm of each metal obtained from a light absorption spectra of Ti, Al, and Nb is used.

A light absorption loss α0 in a case of the Au single film illustrated in line 200 (without a base layer) is a light absorption loss as a background in the above-described configuration, and the light absorption loss in the first base layer 154 can be evaluated as the increase in light absorption loss from this reference line.

Lines 202, 204, and 206 illustrate light absorption losses in a case where a metal constituting the first base layer 154 includes Ti, Al, and Nb, respectively. Among these metals, Ti illustrated by line 202 has the largest light absorption loss, and the light absorption loss increases greatly with a film thickness.

On the other hand, in lines 204 and 206 illustrating a case where Al and Nb of which operating wavelengths are not included in a light absorption region are used as the first base layer 154, the light absorption loss is significantly reduced as compared with a case of Ti (line 202). Ina range of the evaluation results illustrated in FIG. 6, in a case where the first base layer 154 is Al (line 204), the light absorption loss is the smallest, and the light absorption loss is substantially constant with respect to the thickness of the base layer. Meanwhile, it is generally known that Al has a low adhesion strength to a substrate.

From lines 206 and 200 in FIG. 6, it is desirable that the thickness of the first base layer 154 including Nb is equal to or lower than 30 nm. If the thickness of the base layer of Nb is within this range, the light absorption loss can be suppressed to a value equal to or lower than $2\alpha 0$, which is twice the value of $\alpha 0$ in the Au single film, or a value of ⅓ or lower of a value in the case of the first base layer 154 using Ti in the related art, which is approximately $6\alpha 0$.

Second Embodiment

Figure 9:
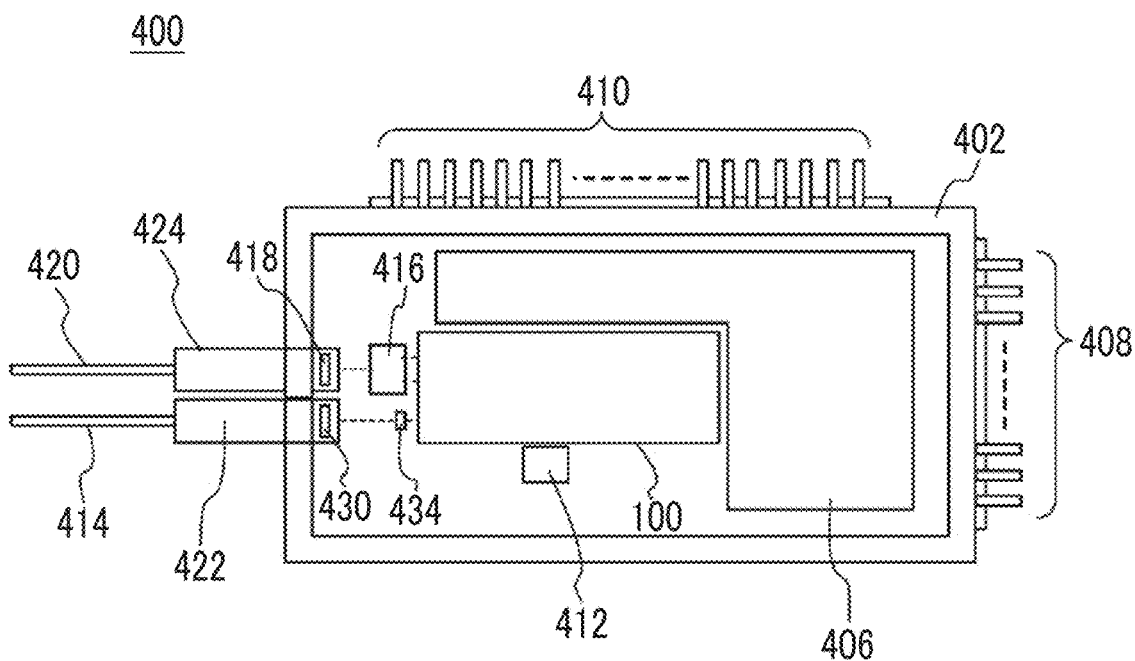
FIG. 9 is a diagram illustrating a configuration of an optical modulator according to a second embodiment of the present invention.

Next, a second embodiment of the present invention will be described. The present embodiment is an optical modulator using the optical modulation element 100 according to the first embodiment described above. FIG. 9 is a diagram illustrating a configuration of an optical modulator 400 according to the second embodiment. The optical modulator 400 includes a case 402, the optical modulation element 100 housed in the case 402, and a relay substrate 406. Finally, a cover (not illustrated), which is a plate body, is fixed to an opening portion of the case 402, and the inside of the case 402 is hermetically sealed.

The optical modulator 400 has signal pins 408 for inputting a high-frequency electrical signal to be used for modulation of the optical modulation element 100, and signal pins 410 for inputting an electrical signal to be used for adjusting an operating point of the optical modulation element 100.

Further, the optical modulator 400 has an input optical fiber 414 for inputting light into the case 402 and an output optical fiber 420 for guiding the light modulated by the optical modulation element 100 to the outside of the case 402, on the same surface of the case 402 (in the present embodiment, the surface on the left side).

Here, the input optical fiber 414 and the output optical fiber 420 are respectively fixed to the case 402 via supports 422 and 424 which are fixing members. The light input from the input optical fiber 414 is collimated by a lens 430 disposed in the support 422, and then input to the optical modulation element 100 via a lens 434. Meanwhile, this is only an example, and the light may be input to the optical modulation element 100, based on the related art, for example, by introducing the input optical fiber 414 into the case 402 via the support 422, and connecting an end surface of the introduced input optical fiber 414 to an end surface of the substrate 102 of the optical modulation element 100.

The light output from the optical modulation element 100 is coupled to the output optical fiber 420 via the optical unit 416 and a lens 418 disposed on the support 424. The optical unit 416 may include a polarization beam combiner that combines two modulated light beams output from the optical modulation element 100 into a single beam.

The relay substrate 406 relays the high-frequency electrical signal input from the signal pins 408 and the electrical signal for adjusting an operating point (bias point) input from the signal pins 410 to the optical modulation element 100, according to a conductor pattern (not illustrated) formed on the relay substrate 406. The conductor patterns on the relay substrate 406 are respectively connected to solder configuring one end of the wiring electrode 118 of the optical modulation element 100 by, for example, wire bonding or the like. Further, the optical modulator 400 includes a terminator 412 having a predetermined impedance in the case 402.

Since the optical modulator 400 having the above-described configuration is configured by using the optical modulation element 100 according to the first embodiment described above, it is possible to achieve a high-frequency optical modulation operation driven at a lower voltage with high reliability, as compared with the related art.

Third Embodiment

Figure 10:
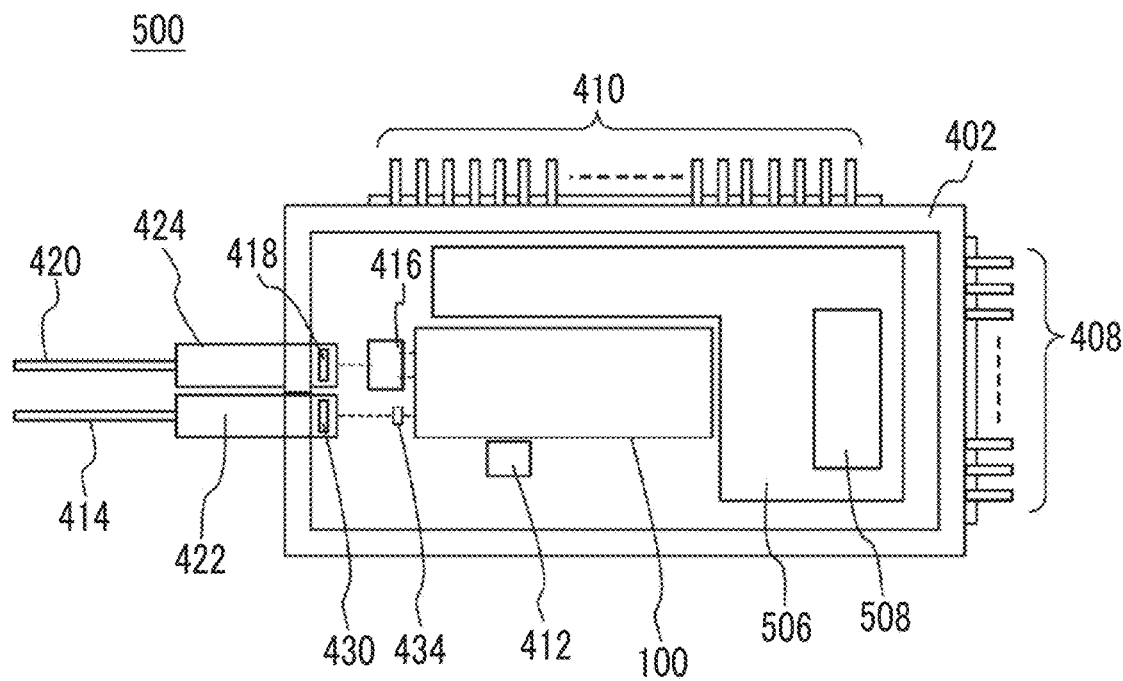
FIG. 10 is a diagram illustrating a configuration of an optical modulation module according to a third embodiment of the present invention.

Next, a third embodiment of the present invention will be described. The present embodiment is an optical modulation module 500 using the optical modulation element according to any one of the above-described embodiments or modification examples. FIG. 10 is a diagram illustrating a configuration of the optical modulation module 500 according to the present embodiment. In FIG. 10, for the same components as in the optical modulator 400 according to the second embodiment illustrated in FIG. 9, the same reference numerals as those illustrated in FIG. 9 are used, and the above description for FIG. 9 is incorporated.

The optical modulation module 500 has the same configuration as the optical modulator 400 illustrated in FIG. 9, but differs from the optical modulator 400 in that it includes a circuit substrate 506 instead of the relay substrate 406. The circuit substrate 506 includes a drive circuit 508. The drive circuit 508 generates a high-frequency electrical signal for driving the optical modulation element 100 based on, for example, a modulation signal supplied from the outside via the signal pins 408, and outputs the generated high-frequency electrical signal to the optical modulation element 100.

Since the optical modulation module 500 having the above-described configuration is configured by using the optical modulation element 100 according to the first embodiment described above, it is possible to achieve a high-frequency optical modulation operation having a lower drive voltage with high reliability, as compared with the related art.

Fourth Embodiment

Figure 11:
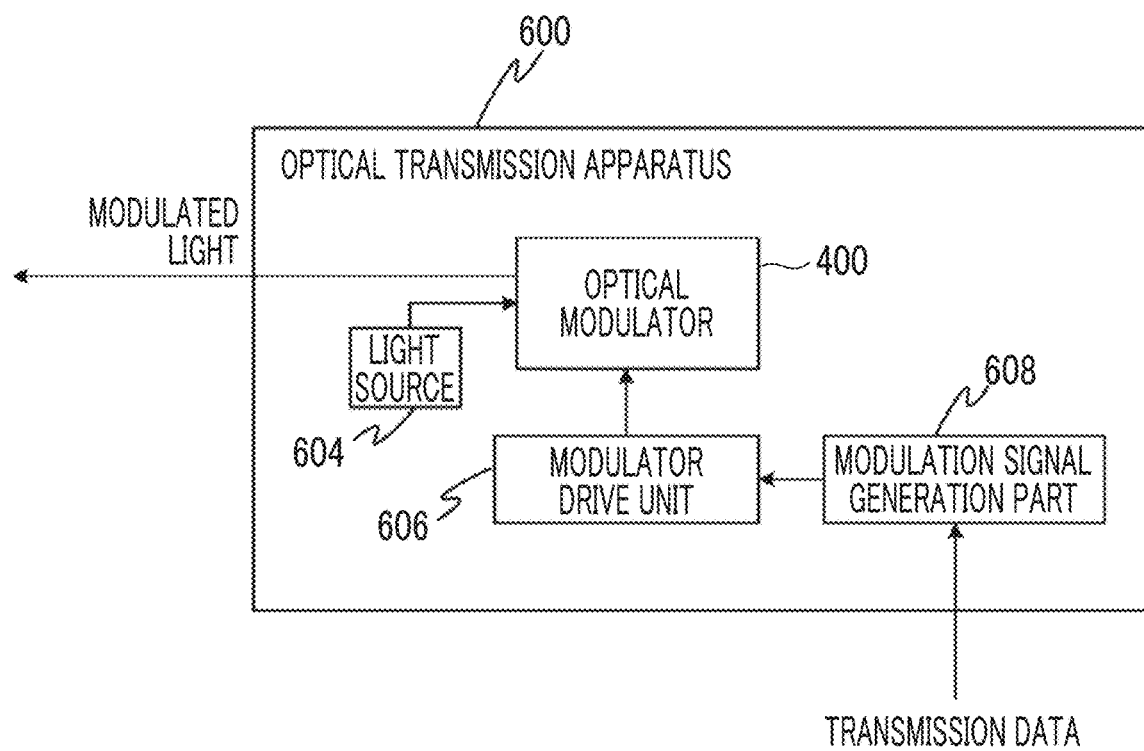
FIG. 11 is a diagram illustrating a configuration of an optical transmission apparatus according to a fourth embodiment of the present invention.

Next, a fourth embodiment of the present invention will be described. The present embodiment is an optical transmission apparatus 600 equipped with the optical modulator 400 according to the second embodiment. FIG. 11 is a diagram illustrating a configuration of the optical transmission apparatus 600 according to the present embodiment. The optical transmission apparatus 600 includes the optical modulator 400, a light source 604 that inputs light to the optical modulator 400, a modulator drive unit 606, and a modulation signal generation part 608. The above-described optical modulation module 500 can also be used instead of the optical modulator 400 and the modulator drive unit 606.

The modulation signal generation part 608 is an electronic circuit that generates an electrical signal for causing the optical modulator 400 to perform a modulation operation, which generates, based on transmission data given from the outside, a modulation signal which is a high-frequency signal for causing the optical modulator 400 to perform an optical modulation operation according to the modulation data, and outputs the modulation signal to the modulator drive unit 606.

The modulator drive unit 606 amplifies the modulation signal input from the modulation signal generation part 608, and outputs a high-frequency electrical signal for driving a signal electrode of the optical modulation element 100 included in the optical modulator 400. As described above, instead of the optical modulator 400 and the modulator drive unit 606, for example, the optical modulation module 500 provided with a drive circuit 508 including a circuit corresponding to the modulator drive unit 606 inside the case 402 can also be used.

The high-frequency electrical signal is input to the signal pins 408 of the optical modulator 400 to drive the optical modulation element 100. Thus, the light output from the light source 604 is modulated by the optical modulator 400, becomes modulated light, and is output from the optical transmission apparatus 600.

Since the optical transmission apparatus 600 having the above-described configuration uses the optical modulation element 100 or the like capable of performing a modulation operation with a small wavelength dependence in a small size, in the same manner as the optical modulator 400 according to the second embodiment and the optical modulation module 500 according to the third embodiment described above, appropriate optical transmission can be performed by achieving a high-frequency optical modulation operation driven at a smaller drive voltage with high reliability, as compared with the related art.

The present invention is not limited to the configuration of the above-described embodiment and its alternative configuration, and can be implemented in various embodiments without departing from the gist thereof.

For example, in the optical modulation element 100 illustrated in FIG. 1, the paths of the wiring electrode 118 and the wiring of the bias electrodes 132*a*, 132*b*, and 132*c* (hereinafter, bias electrode wiring) are not limited to the paths illustrated in FIG. 1. The paths of the wiring electrode 118 and the bias electrode wiring on the substrate 102 are any paths as long as the paths do not act on the optical waveguide 104, based on the related art. For example, the wiring electrode 118 may be extended linearly from the signal electrode 114-1 so as not to act on the optical waveguide 104. Further, the bias electrode wiring may be formed by any path so as to reach the side 140*b* facing the side 140*a* on which the input waveguide 106 and the output waveguides 126*a* and 126*b* are formed, for example.

Further, in the region on the substrate 102, a conductor pattern including a third base layer made of a third material different from a first material and a third conductive layer on the third base layer may be formed, in a region other than a path from an input end to an output end of an optical signal of the optical waveguide 104. Here, the input end is an edge of the input waveguide 106 to which light is input, and the output end is edges of the output waveguides 126*a* and 126*b* through which the light input from the input end is output. Further, the region other than the path from the input end to the output end of the optical signal of the optical waveguide 104 means a region in which unnecessary light that is not used as the optical signal propagates. For example, a radiated light beam waveguide added to a Y-branched waveguide, through which unnecessary radiated light propagates, a region on the substrate 102 in which stray light propagates, or the like is the "region other than the path from the input end to the output end" described above.

Figure 7:
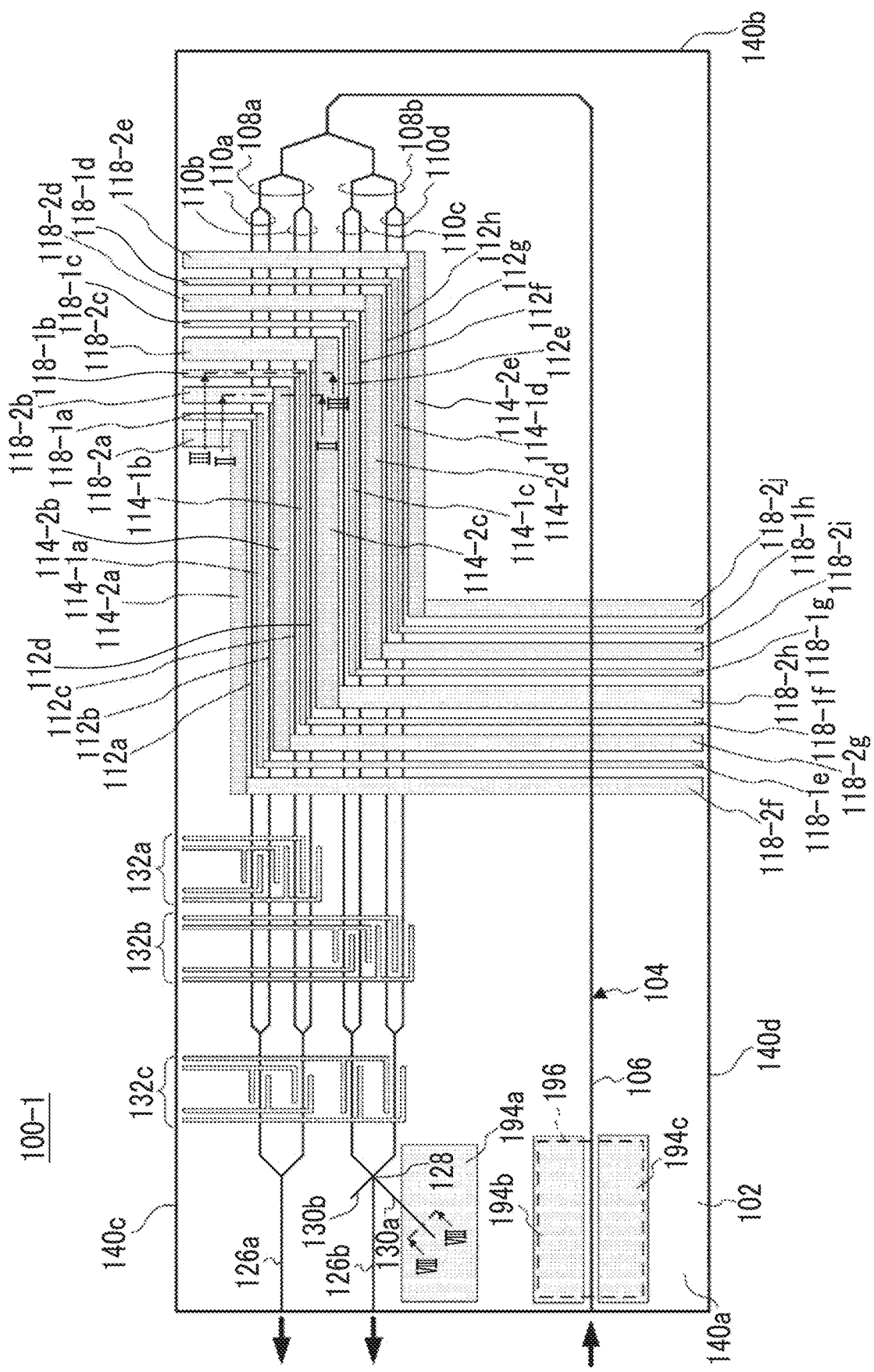
FIG. 7 is a diagram illustrating a configuration of an optical modulation element according to a modification example of a first embodiment.

FIG. 7 illustrates an optical modulation element 100-1, in which a third base layer and a third conductive layer are formed in a region other than a path from an input end to an output end of an optical signal, according to a modification example of the optical modulation element 100 illustrated in FIG. 1. In FIG. 7, the same reference numerals as those in FIG. 1 are used for the same components as those of the components illustrated in FIG. 1, and the above description of FIG. 1 is adopted.

In the optical modulation element 100-1 illustrated in FIG. 7, in addition to the components of the optical modulation element 100 illustrated in FIG. 1, radiated light beam waveguides 130*a* and 130*b* for propagating radiated light that leaks without being combined are provided, in a Y-branch coupler 128, which is a Y-branched waveguide constituting the nest-shaped Mach-Zehnder type optical waveguide 108*b*. Then, a conductor pattern 194*a* is formed in a region, in which the radiated light beam waveguide 130*a* is formed, on the substrate 102 so as to cover at least a part of the radiated light beam waveguide 130*a*.

Figure 8:
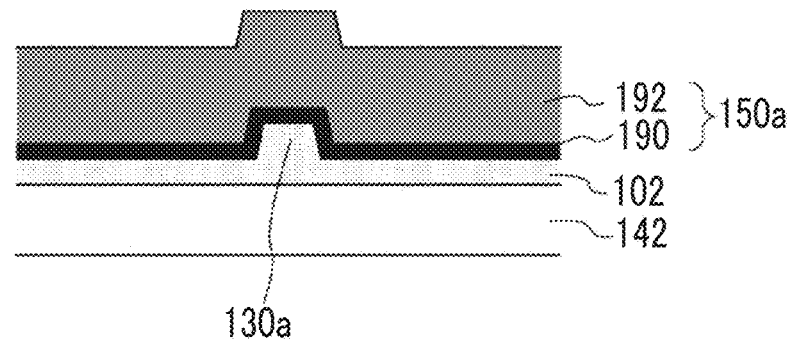
FIG. 8 is a cross-sectional view taken along line VIII-VIII of the optical modulation element illustrated in FIG. 7.

FIG. 8 is a cross-sectional view taken along line VIII-VIII in FIG. 7, which is a cross-sectional view of a portion at which the radiated light beam waveguide 130*a* is formed. The conductor pattern 194*a* covering the radiated light beam waveguide 130*a* includes a third base layer 190 made of a third material different from the first material described above and a third conductive layer 192 on the third base layer 190.

Here, the third material can have a light absorption coefficient at a wavelength of light propagating through the optical waveguide 104, which is larger than a light absorption coefficient of the first material at the wavelength of the light. The third material is, for example, nickel. Thus, the unnecessary light propagating through the radiated light beam waveguide 130*a* is efficiently absorbed by nickel constituting the third base layer 190. In this case as well, the above-described niobium can be used as the first material. Further, the third material can be titanium.

In the optical modulation element 100-1 illustrated in FIG. 7, on the substrate 102, conductor patterns 194*b* and 194*c* are formed while avoiding the input waveguide 106 so as to overlap a rectangular region 196 illustrated by the dotted rectangle line adjacent to an optical input end of the optical waveguide 104 (a portion of the left side 140*a* at which the edge of the input waveguide 106 is formed). The conductor patterns 194*b* and 194*c* include a third base layer and a third conductive layer on the third base layer, in the same manner as the conductor pattern 194*a* illustrated in FIG. 8. Thus, unnecessary light input from the optical input end and propagating on the substrate 102 without being coupled to the input waveguide 106 can be effectively absorbed by the conductor patterns 194*b* and 194*c*.

The position of the third base layer formed on the substrate 102 is not limited to the positions of the conductor pattern 194*a*, 194*b*, and 194*c*, and can be any position at which the unnecessary light is absorbed. Further, in the example in FIG. 7, the conductor pattern 194*a* including the third base layer 190 is formed at one radiated light beam waveguide 130*a* provided in the Y-branch coupler 128, and the conductor pattern may be formed at the radiated light beam waveguide 130*b* in the same manner. Further, the radiated light beam waveguide may be provided in any other Y-branched portion included in the optical waveguide 104, and the conductor pattern including the third base layer may be formed in each of the radiated light beam waveguides. For example, in a case where a light-receiving element is disposed at an edge of the radiated light beam waveguide 130a to monitor the amount of light output from the radiated light beam waveguide 130a, the edge of the radiated light beam waveguide 130a is an output end of an optical signal of the optical waveguide 104, so the conductor pattern including the third base layer is not formed.

With these configurations, it is possible to suppress the absorption of the light wave due to the working electrode that controls the light wave, and it is possible to effectively remove the unnecessary light propagating on the substrate 102.

Further, in the first embodiment, as an example of the optical waveguide device according to the present invention, the optical modulation element 100 configured with the substrate 102 which is LN (LiNbO3) is illustrated. Meanwhile, the optical waveguide device according to the present invention is not limited thereto. The optical waveguide device can be an element having any function (optical modulation, optical switch, optical directional coupler, or the like) including a substrate of any material (LN, InP, Si, or the like). Such an element can be, for example, a so-called silicon photonics waveguide device.

Further, in the above-described embodiment, the substrate 102 is, for example, an X-cut (substrate normal direction is X-axis of crystal axis) LN substrate (so-called X-plate). Meanwhile, a Z-cut LN substrate can also be used as the substrate 102.

As described above, the optical modulation element 100, which is an optical waveguide device according to the above-described embodiment, has the substrate 102, the optical waveguide 104 formed on the substrate 102, and the working electrode 114 that controls a light wave propagating through the optical waveguide 104 (that is, signal electrode 114-1 and ground electrode 114-2). The working electrode 114 includes the first base layer 154 made of a first material (for example, niobium), the first conductive layer 156 on the first base layer 154, the second base layer 158, which is the second base layer 158 on the first conductive layer 156c and is made of a second material (for example, titanium) different from the first material, and the second conductive layer 160 on the second base layer 158. Then, in the cross-section perpendicular to the extending direction of the parallel waveguide 112, the edge of the second base layer 158 on the optical waveguide 104 side, for example, the edge 162 on the parallel waveguide 112 side, which is a part of the optical waveguide 104, is covered with the second conductive layer 160.

With this configuration, it is possible to prevent over-etching of the second base layer 158 below the second conductive layer 160 and to form the signal electrode 114-1 having an appropriate side surface state, so that an optical waveguide device having high long-term reliability and operation stability can be achieved.

Further, the optical modulation element 100 includes the wiring electrode 118 connected to the working electrode 114. The wiring electrode 118 includes the second conductive layer 160 extending from the working electrode 114. With this configuration, the wiring electrode 118 can be manufactured at the same time when the second-stage electrode 152 of the working electrode 114 is formed.

In addition, the second material constituting the second base layer 158 is titanium (Ti), and the first conductive layer 156 and the second conductive layer 160 are made of gold (Au). With this configuration, the second base layer 158, the first conductive layer 156, and the second conductive layer 160 are formed by using titanium and gold used as the material of the base layer and the material of the conductive layer in the related art, respectively. Therefore, these layers can be formed by the same steps in the related art.

In addition, the first material constituting the first base layer 154 is niobium (Nb). With this configuration, the first-stage electrode 150 of the working electrode 114 is closer to the parallel waveguide 112 as compared with a case where the first base layer is configured by using titanium used as the material of the base layer in the related art. Therefore, it is possible to increase electric field efficiency and achieve a high-frequency optical waveguide device driven at a low voltage.

Further, in the optical modulation element 100, the thickness of the first base layer 154 including niobium is equal to or lower than 30 nm, and a thickness of the second base layer 158 is equal to or higher than 100 nm. With this configuration, the second-stage electrode 152 can be firmly fixed on the first-stage electrode 150 by the second base layer 158 having the sufficient thickness while niobium constituting the first base layer 154 suppresses an increase in light absorption loss occurring in the parallel waveguide 112.

Further, the optical waveguide 104 constituting the optical modulation element 100 is a protruding optical waveguide including the protruding portion 144 extending on the substrate 102. With this configuration, it is possible to further increase the electric field efficiency and further decrease the drive voltage, so it is possible to achieve the high-frequency optical modulation element with a low loss.

Further, the optical modulation element 100 has the two working electrodes 114 (that is, the signal electrode 114-1 and the ground electrode 114-2) sandwiching the parallel waveguide 112 of the optical waveguide 104 in the plane of the substrate 102. Then, the gap between these two working electrodes 114 is equal to or higher than 1.0 μm and equal to or lower than 5.0 μm. With this configuration, even in a case where fine unevenness exists on the substrate 102 at a gap of approximately 3 μm, over-etching of the second base layer 158 of the working electrode 114 can be prevented, and the working electrode 114 having an appropriate side surface shape can be formed.

Further, the manufacturing step of the optical modulation element 100 includes a step of forming a part of the second conductive layer 160 by gold plating. With this configuration, even in a case where the layer of the second material which is the same as the material of the second base layer 158 must be maintained with a fine gap on the substrate 102 until after the formation of the second conductive layer 160, it is possible to prevent the second base layer 158 of the working electrode 114 from being over-etched at the time of subsequent etching of the second material after that, and to form the working electrode 114 having the appropriate side surface shape.

Further, the optical modulator 400 according to the second embodiment described above includes the optical modulation element 100 that modulates light, the case 402 that houses the optical modulation element 100, the input optical fiber 414 through which the light is input to the optical modulation element 100, and the output optical fiber 420 that guides the light output from the optical modulation element 100 to the outside of the case 402.

Further, the optical modulation module 500 according to the third embodiment described above includes an optical modulation element 100, a case 402 that houses the optical modulation element 100, an input optical fiber 414 that inputs light to the optical modulation element 100, an output optical fiber 420 that guides the light output by the optical modulation element 100 to the outside of the case 402, and a drive circuit 508 that drives the optical modulation element.

Further, the optical transmission apparatus 600 according to the fourth embodiment described above includes the optical modulator 400 according to the second embodiment or the optical modulation module 500 according to the third embodiment, and a modulation signal generation part 608 which is an electronic circuit for generating an electrical signal for causing the optical modulation element 100 to perform a modulation operation.

According to these configurations, it is possible to achieve the optical modulator 400, the optical modulation module 500, or the optical transmission apparatus 600 with low power consumption, high-frequency, and low loss.

What is claimed is:

1. An optical waveguide device comprising:
    a substrate;
    an optical waveguide formed on the substrate; and
    two working electrodes that face each other across the optical waveguide and control a light wave propagating through the optical waveguide,
    wherein each of the working electrodes includes
        a first base layer made of a first material,
        a first conductive layer on the first base layer,
        a second base layer made of a second material different from the first material, which is on the first conductive layer, and
        a second conductive layer on the second base layer, and
    an edge of the second base layer facing the optical waveguide is covered with the second conductive layer, in a cross-section perpendicular to an extending direction of the optical waveguide.

2. The optical waveguide device according to claim 1, further comprising:
    a wiring electrode connected to the working electrode,
    wherein the wiring electrode includes the second conductive layer extending from the working electrode.

3. The optical waveguide device according to claim 1, wherein the second material is made of titanium (Ti), and the first conductive layer and the second conductive layer are made of gold (Au).

4. The optical waveguide device according to claim 3, wherein the first material includes niobium (Nb).

5. The optical waveguide device according to claim 4, wherein a thickness of the first base layer is equal to or lower than 30 nm, and
    a thickness of the second base layer is equal to or higher than 100 nm.

6. A manufacturing method of the optical waveguide device according to claim 3, the method comprising:
    forming a part of the second conductive layer by gold plating.

7. The optical waveguide device according to claim 1, wherein the optical waveguide is a protruding optical waveguide including a protruding portion extending on the substrate.

8. The optical waveguide device according to claim 7, wherein a gap between the two working electrodes is equal to or higher than 1.0 μm and equal to or lower than 5.0 μm.

9. The optical waveguide device according to claim 1, wherein a conductor pattern including a third base layer made of a third material different from the first material and a third conductive layer on the third base layer is formed in a region other than a path from an input end to an output end of the optical waveguide, in a region on the substrate.

10. The optical waveguide device according to claim 9, wherein the third material has a light absorption coefficient at a wavelength of light propagating through the optical waveguide, which is larger than a light absorption coefficient of the first material at the wavelength of the light.

11. An optical modulator comprising:
    the optical waveguide device according to claim 1, which is an optical modulation element that modulates light;
    a case that houses the optical waveguide device;
    an optical fiber through which light is input to the optical waveguide device; and
    another optical fiber that guides light output by the optical waveguide device to an outside of the case.

12. An optical transmission apparatus comprising:
    the optical modulator according to claim 11; and
    an electronic circuit that generates an electrical signal for causing the optical waveguide device to perform a modulation operation.

13. An optical modulation module comprising:
    the optical waveguide device according to claim 1, which is an optical modulation element that modulates light;
    a case that houses the optical waveguide device;
    an optical fiber through which light is input to the optical waveguide device;
    another optical fiber that guides light output by the optical waveguide device to an outside of the case; and
    a drive circuit that drives the optical waveguide device.

14. An optical transmission apparatus comprising:
    the optical modulation module according to claim 12; and
    an electronic circuit that generates an electrical signal for causing the optical waveguide device to perform a modulation operation.

* * * * *